Patented Feb. 15, 1949

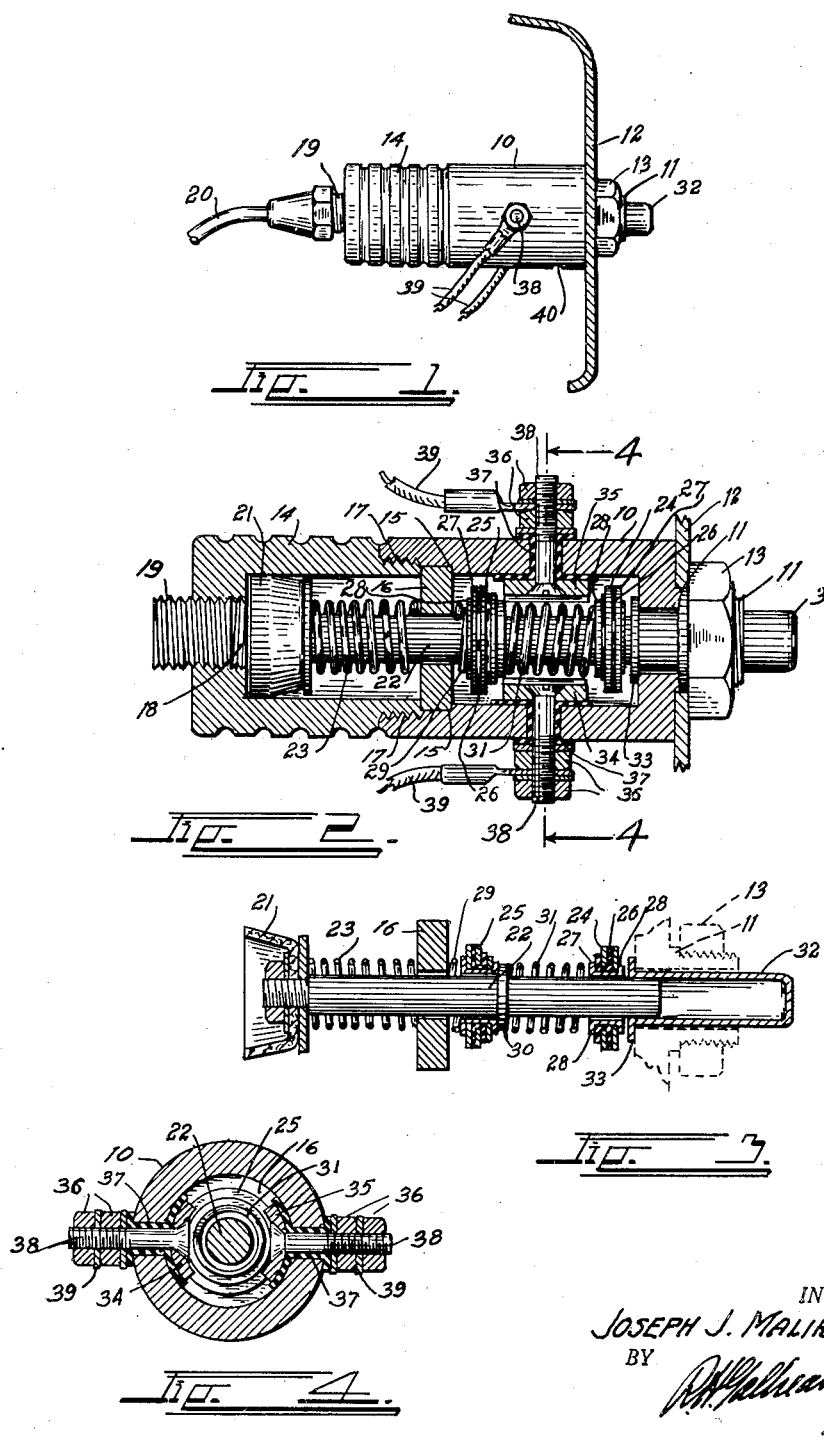

2,461,692

UNITED STATES PATENT OFFICE 2,461,692

SAFETY CUTOUT FOR AUTOMOTIVE ENGINES

Joseph J. Malir, Jr., Denver, Colo.

Application April 22, 1946, Serial No. 663,902

2 Claims. (Cl. 200—81.5)

This invention relates to an automatic electric switch for automobiles and has for its principel object the provision of a mechanism which will shut off the entire electrical supply to the automobile and its engine in case of motor failure or other accidental cause; which will automatically stop the motor when the latter runs out of oil and prevent operation of the motor without oil; which will act as a theft lock to prevent unauthorized starting of the motor; and which will prevent accidental draining of the battery by the lights, radio, heater, ignition, etc., when the car is not in use.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side view of the improved safety device for automotive engines, illustrating it in place on the instrument panel of an automobile;

Fig. 2 is a longitudinal section therethrough;

Fig. 3 is an enlarged detail sectional view of the piston rod assembly of the improved safety device; and Fig. 4 is a cross-section taken on the line 4—4, Fig. 2.

The invention comprises a cylindrical housing 10 terminating in a hollow threaded nipple 11 arranged to be passed through an instrument panel 12 of an automobile. A mounting nut 13 threaded on the nipple 11 clamps the housing 10 to the back of the panel 12.

The other extremity of the housing is internally threaded, as shown at 17, to receive an open extremity of a pressure cylinder 14. The housing 10 is also provided with an internal shoulder 15, against which a circular cylinder head 16 is clamped by the cylinder 14 and the action of the threads 17.

The other or closed extremity of the cylinder 14 contains a threaded nipple socket 18 for receiving a pipe or tubing nipple 19 by means of which the cylinder is placed in communication with the oil pressure system of the automobile engine through an oil pipe 20.

The cylinder 14 contains a piston 21 which is longitudinally slidable therein. A piston rod 22 extends from the piston 21 through the cylinder head 16 and throughout the length of the housing 10. A piston spring 23 surrounds the rod 22 between the piston head 16 and the piston 21 to constantly urge the piston toward the nipple opening.

A first annular contact disc 24 and a second annular contact disc 25 are tiltably and slidably mounted on the rod 22. Both discs are supported in a similar manner. Each is surrounded by suitable electrical insulation 26 and clamped against stiffening washers 27 between flanges on a flanged spool 28 which is loosely mounted on the rod 22.

A first contact spring 29 surrounds the rod 22 between the cylinder head 16 and the second spool 28 of the second contact disc 25 to constantly urge the latter against a collar 30 formed on the rod 22 intermediate the two discs. A second contact spring 31 surrounds the rod 22 between the collar 30 and the first spool 28 of the first contact disc 24 to maintain the two spools 28 separated.

A hollow, thimble-like button member 32 extends through the latter end of the housing 10 and through the nipple 11 so as to project therefrom. The button member 32 slidably receives the end of the rod 22 and is provided with a flange 33 which prevents it from being forced through the end of the housing.

Two contact plates 34 and 35 are mounted in the housing, one on each side thereof, between the contact discs 24 and 25. The plates 34 and 35 are secured in place by means of suitable binding screws 38, upon which terminal nuts 36 are threaded. The plates 34 and 35, the screws 38, and the nuts 36 are electrically insulated from the housing 10 by means of suitable insulation 37. The plates 34 and 35 project into the housing sufficiently far to be simultaneously contacted by either of the discs 24 and 25 when the latter are moved against them. The binding screws 38 are connected in series, with the electrical supply mains of the automobile indicated at 39 (exclusive of the starter circuit).

In use, the operator of the automobile closes his ignition switch and his starter switch. He then presses the button member 32 inwardly. This forces the first spool 28 and the contact disc 24 inwardly, compressing the spring 31, until the first contact disc 24 contacts the plates 34 and 35 and closes the ignition circuit of the engine. When the engine starts, oil pressure is developed therein which acts against the piston 21 to force the rod 22 outwardly, compressing the springs 23 and 31. This moves the collar 30 away from the spool 28 of the disc 25, allowing the spring 29 to expand to force the second spool 28 outwardly to carry the second contact disc 25 against the contact plates 34 and 35, after which the button 32 may be released, since the igntion circuit is closed by the disc 25.

It will be noted that the rod 22 may continue to move through the second spool 28 carrying the disc 25, compressing the springs 23 and 31, without further movement of the disc 25. It will also be noted that the piston 21 can make a considerable return movement before the collar 30 contacts the second spool 28 to carry the disc 25 inwardly to break the circuit. Therefore, only the initial pressure increase and final pressure decrease operate the device. Intermediate variations have no effect on the opening and closing of the circuit. A vent hole 40 is formed in the housing to relieve any pressure on the back of the piston 21 and to drain away any oil which might accidentally leak past the piston.

The spring 23 is preferably such that a pressure of 5 lbs. per square inch will move the piston 21 sufficiently to close the contact. The spring 29 is, of course, a lighter spring to enable it to be compressed by the spring 23. It will be noted that the loose fit of the spools 28 on the rod 22 allows the discs 24 and 25 to freely tilt to accommodate any unevenness in the positions of the plates 34 and 35.

It can be readily seen that the device serves many useful functions. As above described, failure of oil will stop the engine. Another function is that it prevents the driver from accidentally leaving his lights, radio, heater, or other electrical devices on, when he leaves the car, thereby draining the battery. As soon as he stops the engine, all of these devices will be automatically cut out of circuit. It also acts as a theft lock, as an ordinary automobile thief is unaware that it is necessary to operate the button 32 before the engine can be used.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A device for cutting off the electrical supply to an automotive engine upon failure of the oil pressure to said engine comprising: a cup-like housing; a hollow threaded nipple projecting from the closed end of said housing and adapted to be passed through a supporting structure; a nut on said nipple clamping said housing to said structure; an open ended pressure cylinder, the open ends of said housing and said cylinder being secured together in axial alignment; a cylinder head separating said cylinder from said housing; means for introducing oil under pressure through the closed end of said cylinder; a piston in said cylinder; a piston rod extending from said piston through said cylinder head and throughout the length of said housing; a first spring positioned between said piston and said cylinder head resisting inward movement of said piston; contact plates extending inwardly from opposite sides of said housing; a first contact disc insulated from and slidably mounted on said rod and adapted to close a circuit between said plates; a second spring compressed between said disc and said cylinder head and urging said disc outward toward said plates; a collar formed on said rod and normally preventing outward movement of said disc until pressure in said cylinder has moved said rod outward to remove said collar from the path of said disc.

2. A device for cutting off the electrical supply to an automotive engine upon failure of the oil pressure to said engine comprising: a cup-like housing; a hollow threaded nipple projecting from the closed end of said housing and adapted to be passed through a supporting structure; a nut on said nipple clamping said housing to said structure; an open ended pressure cylinder, the open ends of said housing and said cylinder being secured together in axial alignment; a cylinder head separating said cylinder from said housing; means for introducing oil under pressure through the closed end of said cylinder; a piston in said cylinder; a piston rod extending from said piston through said cylinder head and throughout the length of said housing; a first spring positioned between said piston and said cylinder head resisting inward movement of said piston; contact plates extending inwardly from opposite sides of said housing; a first contact disc insulated from and slidably mounted on said rod and adapted to close a circuit between said plates; a second spring compressed between said disc and said cylinder head and urging said disc outward toward said plates; a collar formed on said rod and normally preventing outward movement of said disc until pressure in said cylinder has moved said rod outward to remove said collar from the path of said disc; a second contact disc insulated from and slidably mounted on said rod on the outside of said contact plate; a third spring surrounding said discs separated; and a thimble-like manually actuated button enclosing the extremity of said rod and projecting through said nipple to enable the second disc to be forced into contact with said plates.

JOSEPH J. MALIR, Jr.

REFERENCES CITED

The following references are of record in the file of this patent:

UNITED STATES PATENTS

| Number | Name | Date |
|---|---|---|
| 2,061,078 | Lacoe | Nov. 17, 1936 |
| 2,251,648 | Wayman | Aug. 5, 1941 |
| 2,402,284 | Hufford | June 18, 1946 |